United States Patent [19]

Gilber't

[11] Patent Number: 5,333,120
[45] Date of Patent: Jul. 26, 1994

[54] BINARY TWO'S COMPLEMENT ARITHMETIC CIRCUIT

[76] Inventor: Joseph R. Gilber't, 1802 W. Cholla St., Unit 210, Phoenix, Ariz. 85029-3769

[21] Appl. No.: 977,652

[22] Filed: Nov. 17, 1992

[51] Int. Cl.$^5$ .............................................. G06F 7/50
[52] U.S. Cl. ................................ 364/786; 364/715.01
[58] Field of Search ............ 364/786, 787, 788, 715.01

[56] References Cited

U.S. PATENT DOCUMENTS

| | | | |
|---|---|---|---|
| 3,816,734 | 6/1974 | Brendzel | 364/786 |
| 3,975,624 | 8/1976 | Kay | 364/786 |
| 3,976,866 | 8/1976 | Motegi et al. | 364/786 |
| 4,707,800 | 11/1987 | Montrone et al. | 364/788 |

*Primary Examiner*—David H. Malzahn
*Attorney, Agent, or Firm*—Donald J. Lisa; Steven Lin

[57] ABSTRACT

A negation circuit (28) generates a two's complement negation by inverting only those bits of an incoming number which have a level of significance greater than the significance level at which a transition bit resides. The transition bit and all bits of the incoming number having a significance level less than the transition bit are reproduced at the output (32) of the negation circuit (28). The transition bit is the least significant bit in the incoming number to exhibit a logic one. A negation selector circuit (40) selectively overrides the negation so that a negation is generated only when a select negation signal (34) is active. When a transition detected input signal (38) is active, all bits of the incoming number are inverted. A transition detected output signal (36) provides a signal which activates to indicate that the circuit (28) has detected a transition bit. The negation circuit (28) may be coupled to an adder (66) to form a direct subtractor or a direct adder/subtractor (64).

26 Claims, 6 Drawing Sheets

| | TWO'S COMPLEMENT BINARY REPRESENTATIONS | | | | | | |
|---|---|---|---|---|---|---|---|
| INCOMING NUMBER DECIMAL | INCOMING NUMBER -- BINARY | | | | INVERT | NEGATE | TRANSITION DETECTED |
| | SIGNIFI-CANCE LEVEL L=3 | SIGNIFI-CANCE LEVEL L=2 | SIGNIFI-CANCE LEVEL L=1 | SIGNIFI-CANCE LEVEL L=0 | | | |
| -8 | 1* | 0 | 0 | 0 | 0111 | 1000 | 1 |
| -7 | 1 | 0 | 0 | 1* | 0110 | 0111 | 1 |
| -6 | 1 | 0 | 1* | 0 | 0101 | 0110 | 1 |
| -5 | 1 | 0 | 1 | 1* | 0100 | 0101 | 1 |
| -4 | 1 | 1* | 0 | 0 | 0011 | 0100 | 1 |
| -3 | 1 | 1 | 0 | 1* | 0010 | 0011 | 1 |
| -2 | 1 | 1 | 1* | 0 | 0001 | 0010 | 1 |
| -1 | 1 | 1 | 1 | 1* | 0000 | 0001 | 0 |
| 0 | 0 | 0 | 0 | 0 | 1111 | 0000 | 1 |
| 1 | 0 | 0 | 0 | 1* | 1110 | 1111 | 1 |
| 2 | 0 | 0 | 1* | 0 | 1101 | 1110 | 1 |
| 3 | 0 | 0 | 1 | 1* | 1100 | 1101 | 1 |
| 4 | 0 | 1* | 0 | 0 | 1011 | 1100 | 1 |
| 5 | 0 | 1 | 0 | 1* | 1010 | 1011 | 1 |
| 6 | 0 | 1 | 1* | 0 | 1001 | 1010 | 1 |
| 7 | 0 | 1 | 1 | 1* | 1000 | 1001 | 1 |

* ASTERISK DENOTES TRANSITION BIT

BINARY TWO'S COMPLEMENT ARITHMETIC CIRCUIT

TECHNICAL FIELD OF THE INVENTION

The present invention relates generally to digital electronic circuits, such as those used in general purpose computers and microprocessors and in special purpose machines. More specifically, the present invention relates to electronic circuits which are used in performing arithmetic operations on two's complement binary numbers.

BACKGROUND OF THE INVENTION

Conventional binary arithmetic circuits perform arithmetic operations, particularly subtraction and negation, in an indirect and inefficient manner. Subtraction has been performed by inverting a subtrahend number to form a one's complement of the subtrahend, adding the inverted subtrahend to a minuend number, and then incrementing the addition result. The incrementing of the addition result is typically accomplished by supplying a carry pulse to an adder when a subtraction is performed. A simple negation has been treated as a special subtraction problem with the minuend forced to equal zero. Thus, the same indirect steps are involved in obtaining a two's complement negation of an incoming number. Often, additional enabling combinatorial logic is required to selectively invert the subtrahend and to selectively apply the carry pulse when a subtraction or negation operation is required and to prevent inversion of the subtrahend and addition of a carry pulse when addition and other arithmetic operations are required.

In many situations, the indirect techniques for performing subtraction and negation operations are undesirable. These indirect techniques often require an undesirably large amount of circuit area or number of components for their implementation. Moreover, these indirect techniques often cause the propagation delay between the time when an incoming number is valid and the time when the subtraction or negation operation results are valid to be undesirably long.

SUMMARY OF THE INVENTION

Accordingly, it is an advantage of the present invention that an improved arithmetic circuit is provided.

Another advantage of the present invention is that an arithmetic circuit is provided which may be incorporated in a wide variety of applications, including arithmetic logic units (ALUs) for microprocessors or other computing circuits, add/subtract circuits, subtraction circuits, and negation circuits.

Another advantage of the present invention is that an arithmetic circuit is provided which generates a two's complement negation of an incoming number in a small amount of space and with a small amount of propagation delay.

Another advantage of the present invention is that an arithmetic circuit is provided which selectively generates a negation of an incoming number.

Another advantage of the present invention is that an arithmetic circuit is provided which selectively performs addition or subtraction operations, wherein the subtraction operations are performed in a direct manner which does not require the generation of a carry input pulse.

Another advantage of the present invention is that an arithmetic circuit is provided which may be adapted to efficiently generate negations for incoming numbers having any number of bits.

The above and other advantages of the present invention are carried out in one form by a binary two's complement arithmetic circuit for performing arithmetic operations on an incoming number. The incoming number is expressed as N bits, where N is an integer number, where each of the N bits exhibits either a logic zero or a logic one, and where a transition bit from these N bits is the least significant one of the N bits to exhibit a logic one. The circuit includes an input section that has N terminals. The N terminals are adapted to receive the N bits of the incoming number in a one-to-one correspondence. A combinatorial logic circuit couples to the input section. The combinatorial logic circuit is configured to invert all bits of the incoming number having greater significance than the transition bit and to transfer, without inverting, the transition bit and all bits having less significance than the transition bit. An output section couples to the combinatorial logic circuit. The output section has at least N−1 terminals corresponding to the N−1 most significant ones of the N bits of the incoming number.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

In the following description of preferred embodiments, certain items are either identical to or closely related to other items. This description distinguishes such items from their counterparts by the use of lower case alphabetic characters ("a", "b", and so on) which are appended to a common reference number. When an alphabetic character is omitted, the description refers to any one of such items and their counterparts individually or to all of them collectively.

DETAILED DESCRIPTION OF THE PREFERRED EMBODIMENTS

Figure 1:
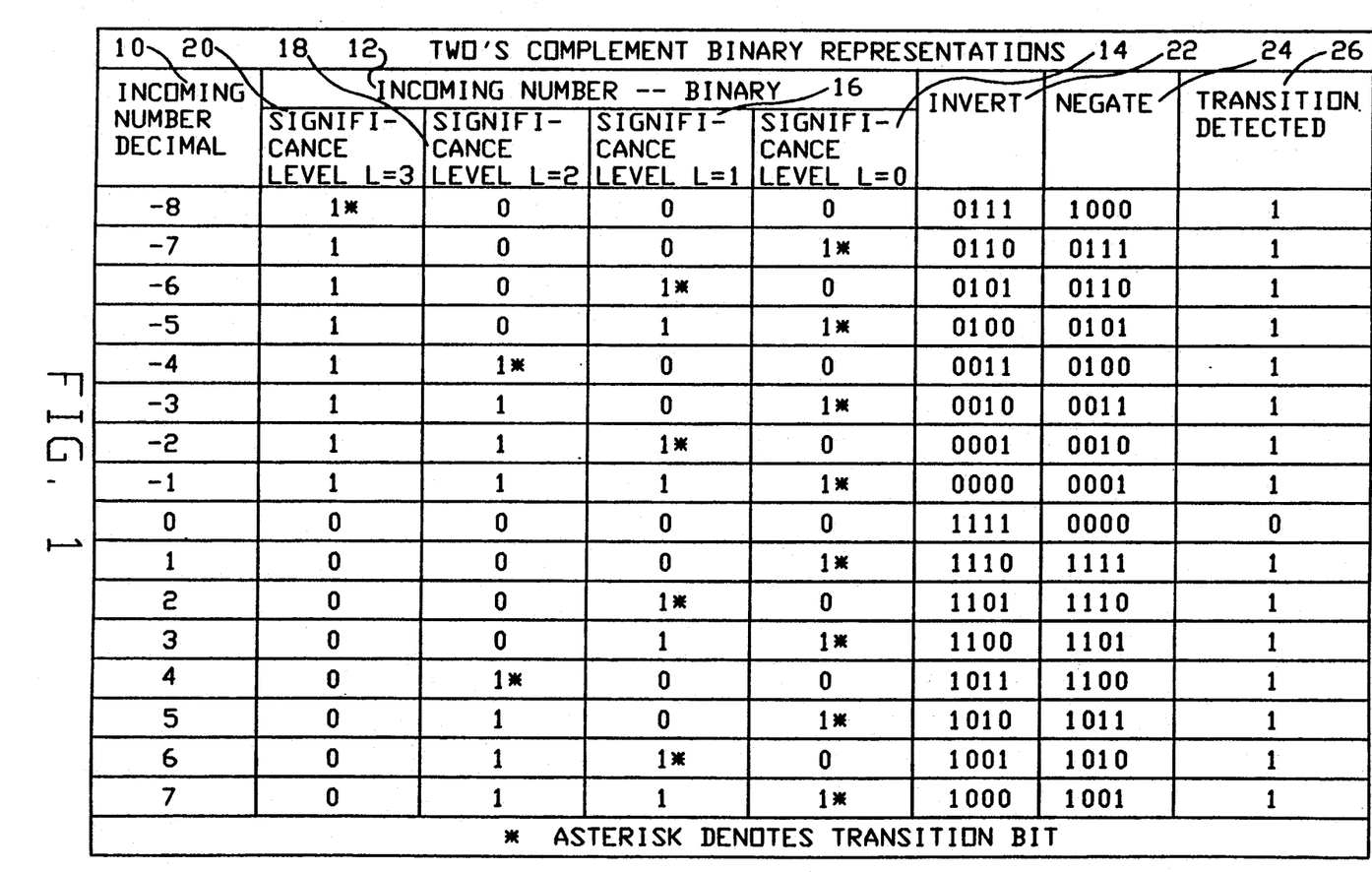
FIG. 1 presents a table of two's complement binary notations with respect to a four bit numbering system.

FIG. 1 presents a table of two's complement binary notations with respect to a four bit numbering system. Incoming number columns 10 and 12 show decimal and binary representations, respectively, of a four bit number upon which a selective negation slice circuit, discussed below, operates. Rows listed in the table of FIG.

1 are dedicated to each of 16 different numbers representable in a four bit numbering system.

Binary incoming number column 12 is divided into four columns 14, 16, 18, and 20 corresponding to significance levels (L) of zero, one, two, and three, respectively, for the four bits which comprise the incoming four bit number. In other words, the least significant bit of the incoming number has a significance level L=0 while the most significant bit of the incoming number has a significance level L=3. Those skilled in the art will appreciate that the significance level (L) identifies the weight a given bit has with respect to a number. This weight equals $2^L$, where L is an integer number.

An invert column 22 in FIG. 1 shows binary notations for the inversion of the incoming numbers. The inversion is sometimes called a complement or one's complement. Those skilled in the art will appreciate that the inversion of a binary number in a two's complement notation system results from changing all bits exhibiting a logic one to a logic zero, and changing all bits exhibiting a logic zero to a logic one.

For the purposes of the present invention, a "logic zero" describes a logical construct, not an actual construct. Thus, a logic zero arithmetically describes a zero, regardless of how the zero is expressed. The zero may be expressed as low voltage or current, a high voltage or current, or the like. Likewise, a "logic one" describes a logical construct, not an actual construct. A logic one arithmetically describes a one, regardless of how the one is expressed. The one may be expressed as high voltage or current, a low voltage or current, or the like.

A negate column 24 in FIG. 1 shows binary notations for the negation of the incoming numbers. Those skilled in the art will appreciate that a negation of an incoming number equals one plus the inversion of the incoming number. Thus, the invert and add-one techniques that are well known in the art for generating negations and subtractions using an incoming number produce arithmetically correct results.

Binary incoming number column 12 additionally indicates which bit, if any, of an incoming number is a transition bit. Transition bits are indicated by an asterisk (*) in FIG. 1. A transition bit is the least significant one of the bits in the incoming number to exhibit a logic one. Thus, the identity of the transition bit changes in response to the value of the incoming number. While FIG. 1 relates only to a four bit numbering system this relationship holds for a two's complement numbering system having any number of bits.

In accordance with the four bit system illustrated in FIG. 1, the transition bit resides at a significance level (L) of three when the incoming number has a decimal value of $-8$. For incoming numbers of $-4$, and $+4$ the transition bit resides at a significance level (L) of two. For incoming numbers of $-6$, $-2$, $+2$, and $+6$, the transition bit resides at a significance level (L) of one. And, for all odd incoming numbers ($-7$, $-5$, $-3$, $-1$, $+1$, $+3$, $+5$, and $+7$) the transition bit resides at a significance level (L) of zero. The incoming number value of zero has no transition bit. A column 26 in FIG. 1 indicates the presence of a transition bit by a logical one notation and the absence of a transition bit by a logical zero notation.

As illustrated in columns 12 and 24, the negation of an incoming number may be obtained directly by inverting only those bits of the incoming number that have a significance level greater than the transition bit. All bits of the incoming number having a significance level less than or equal to the transition bit are simply reproduced in a one to one correspondence in the negation of the incoming number. It is this transition-bit-based technique for directly obtaining a negation of an incoming number that the present invention implements.

Figure 2:
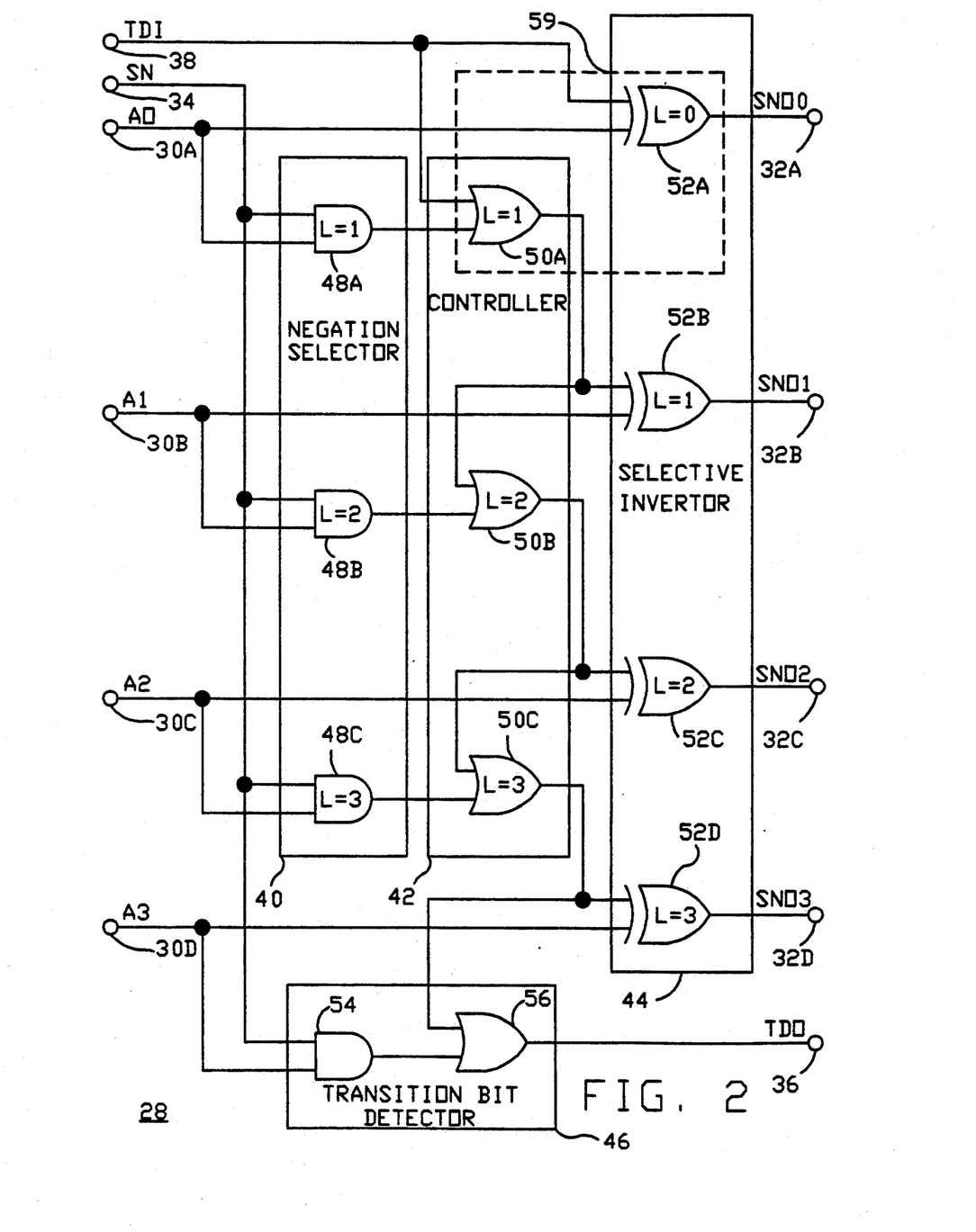
FIG. 2 shows a schematic logic diagram of a first embodiment of a selective negation slice circuit which selectively negates an incoming four bit number.

FIG. 2 shows a schematic logic diagram of a first embodiment of a selective negation slice circuit 28 which selectively negates an incoming four bit, two's complement number. Circuit 28 includes input terminals 30a, 30b, 30c, and 30d, which are adapted to receive an incoming number. Terminal 30a, labeled as "A0" receives the bit of the incoming number that has a significance level L=0 (see FIG. 1); terminal 30b, labeled as "A1" receives the bit of the incoming number that has a significance level L=1; terminal 30c, labeled as "A2", receives the bit of the incoming number that has a significance level L=2; and terminal 30d, labeled as "A3" receives the bit of the incoming number that has a significance level L=3. Output terminals 32a, 32b, 32c, and 32d provide the selectively negated output number from circuit 28. Terminal 32a, labeled as "SNO0" for "Selectively Negated Output 0", provides an output bit having a significance level L=0 (see FIG. 1); terminal 32b, labeled as "SNO1" provides an output bit having a significance level L=1; terminal 32c, labeled as "SNO2", provides an output bit having a significance level L=2; and terminal 32d, labeled as "SNO3", provides an output bit having a significance level L=3.

A terminal 34, labeled as "SN" is adapted to receive a "Select Negation" signal. When active, which is a logic one in the embodiment illustrated in FIG. 1, the SN signal causes circuit 28 to generate the negation of the incoming number at output terminals 32. When inactive, which is a logic zero in the embodiment illustrated in FIG. 1, the SN signal causes circuit 28 to reproduce the incoming number at its output terminals 32.

A terminal 36, labeled as "TDO" for "Transition bit Detected Output" is activated, to a logic one in the embodiment illustrated in FIG. 2, when circuit 28 detects a transition bit in the incoming number. Terminal 36 generates an inactive output when circuit 28 receives an incoming number which does not have a transition bit. Thus, terminal 36 follows the truth table presented by column 26 in FIG. 1. A terminal 38, labeled "TDI", is adapted to receive a "Transition Detected Input" signal. Terminals 36 and 38 are used when slice circuit 28 is combined with other slice circuits 28, as discussed below in connection with FIG. 3, to selectively negate numbers that are more than four bits wide.

Those skilled in the art will appreciate that many different combinatorial logic circuits may be devised to implement the above-discussed selective negation circuit. Circuit 28 illustrated in FIG. 2 represents an embodiment which is particularly adapted to reduce the number of devices and to teach the principles employed in the present invention.

Circuit 28 includes a negation selector 40, a controller 42, a selective invertor 44, and a transition bit detector 46. Negation selector 40 includes three, two-input AND gates 48a, 48b, and 48c, which are associated with the $N-1$ least significant bits of the N bit incoming number in a one to one correspondence. The variable N equals the integer four for the four-bit slice illustrated in FIG. 2. In particular, one input of each AND gate couples to Select Negation terminal 34. The other input for an AND gate of significance level L couples to the terminal 30 which receives the bit of the incoming number which has significance level L−1. Thus, an input of AND gate 48a, having a significance level L=1, couples to terminal 30a; an input of AND gate 48b, having a significance level L=2, couples to terminal 30b; and an input of AND gate 48c, having a significance level L=3, couples to terminal 30c.

In an alternate embodiment, negation selector 40 and terminal 34 may be omitted. If negation selector 40 and terminal 34 are omitted, circuit 28 generates only a negation of the incoming number. When negation selector 40 is omitted, terminals 30 may be substituted for the outputs of negation selector 40.

Controller 42 includes three, two-input OR gates 50a, 50b, and 50c, which are associated with the N−1 least significant bits of the incoming number in a one to one correspondence. One input of each OR gate couples to a corresponding output from one of AND gates 48. In other words, an input of OR gate 50a couples to the output of AND gate 48a, an input of OR gate 50b couples to the output of AND gate 48b, and an input of OR gate 50c couples to the output of AND gate 48c. The other input for an OR gate 50 of significance level L couples to the output of the OR gate 50 for significance level L−1. Thus, an input of OR gate 50c, having a significance level L=3, couples to the output of OR gate 50b, having significance level L=2; and an input of OR gate 50b, having a significance level L=2, couples to an output of OR gate 50a, having significance level L=1. An input of OR gate 50a, having significance level L=1, couples to TDI terminal 38.

For each bit of the incoming number, selective invertor 44 includes a number-input coupled to the terminal 30 which receives the incoming number bit and a control-input which couples to a corresponding output from controller 42. Outputs of selective invertor 44 couple to terminals 32. In particular, selective invertor 44 includes four, two-input Exclusive OR gates 52a, 52b, 52c, and 52d. The outputs of Exclusive OR gates 52 serve as the outputs from selective invertor 44, and one of the inputs from each Exclusive OR gate 52 serves as a number-input. The other input for each Exclusive OR gate 52 serves as the control-input. In particular, an output from OR gate 50c of controller 42, which has a significance level L=3, couples to an input of Exclusive OR gate 52d, also having a significance level L=3 an output from OR gate 50b, which has a significance level L=2, couples to an input of Exclusive OR gate 52c, also having a significance level L=2; and an output from OR gate 50a, which has a significance level L=1, couples to an input of Exclusive OR gate 52b, also having a significance level L=1. TDI terminal 38 directly couples to an input of Exclusive OR gate 52a, which has a significance level L=0.

Transition bit detector 46 includes a two-input AND gate 54 having a first input coupled to SN terminal 34 and a second input coupled to the A3 input terminal 30d. An output of AND gate 54 couples to a first input of a two-input OR gate 56. A second input of OR gate 56 couples to the output of OR gate 50c from controller 42. An output of OR gate 56 couples to TDO terminal 36.

Selective invertor 44 selectively inverts the bits of the incoming number, depending on the states of corresponding outputs from controller 42. Controller 42 is configured to generate a logical one at the level of significance where the transition bit resides for the incoming number and a logic zero for all bits having a lower significance level than the transition bit. In addition, controller 42 generates a logical one for all bits having a significance level greater than the transition bit. Logical zeros from controller 42 cause selective invertor 44 to transfer corresponding bits of the incoming number without inversion, and logical ones cause selective invertor 44 to invert corresponding bits of the incoming number. Negation selector 40 is configured to enable controller 42 when the select negation signal applied at SN terminal 34 is active and to disable controller 42 when the select negation signal at terminal 34 is inactive. When controller 42 is disabled, controller 42 generates logical zeros at all levels of significance, and selective invertor 44 transfers all bits of the incoming number without inversion of any bit.

Figures 3, 4:
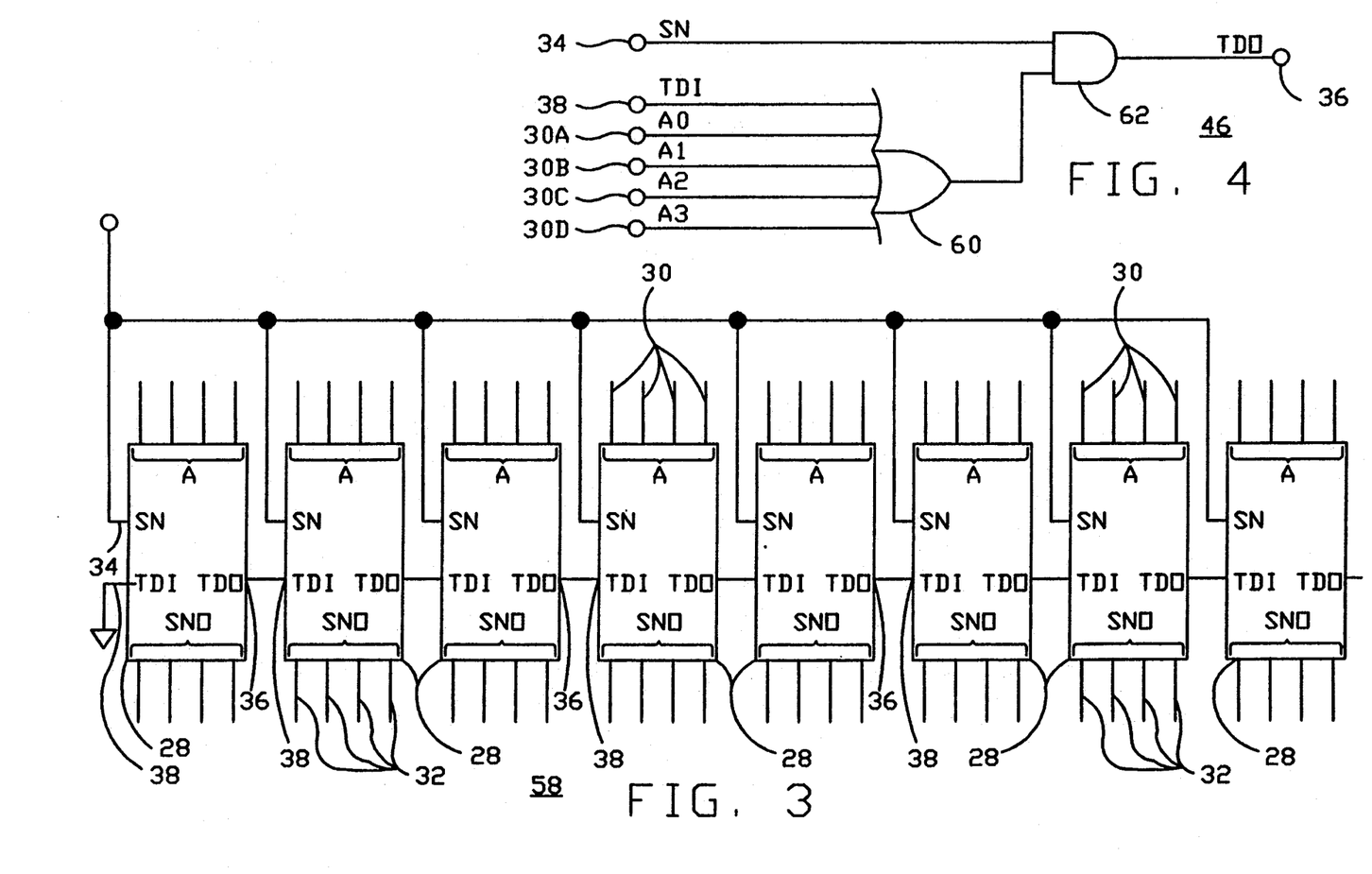
FIG. 3 shows a block diagram of a selective negation circuit which includes numerous selective negation slice circuits.
FIG. 4 shows a schematic logic diagram of a second embodiment of a transition bit detector portion of a selective negation slice circuit.

FIG. 3 shows a block diagram of a selective negation circuit 58 which includes numerous selective negation slice circuits 28. In particular, FIG. 3 illustrates eight of circuits 28 coupled together to form a 32-bit selective negation circuit. However, those skilled in the art will appreciate that any number of slice circuits 28 may be combined to operate on incoming numbers having any number of bits. As shown in FIG. 3, the transition detected output (TDO) 36 from each slice circuit 28 couples to the transition detected input (TDI) for the next most significant slice circuit 28. All select negation (SN) terminals 34 for all slice circuits 28 couple together.

Figure 2A:
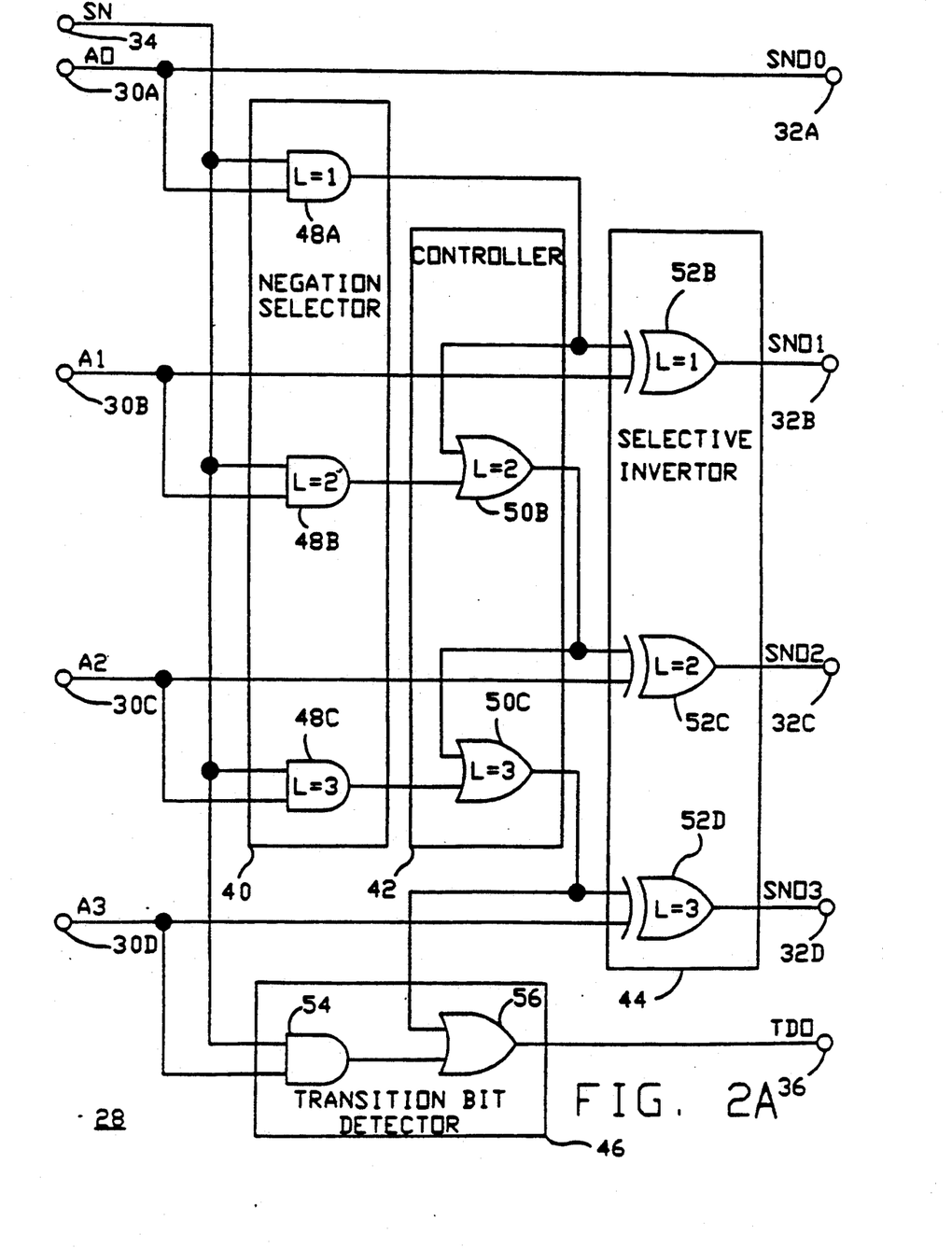
FIG. 2A shows a schematic logic diagram of an alternative first embodiment of a selective negation circuit which selectively negates an incoming number.

TDI terminal 38 for the least significant slice circuit 28 may be omitted or terminal 38 may couple to a constant source for logic zero, such as ground. Referring to FIG. 2A, when TDI terminal 38 is omitted, the LSB circuit 59, consisting of OR gate 50a from controller 42 and Exclusive OR gate 52a from selective invertor 44 is likewise omitted. In FIG. 2, dotted lines illustrate connections utilized when gates 50a and 52a are omitted. Thus, the output of AND gate 48a may be substituted for the output of OR gate 50a, and the A0 input terminal 30a may directly couple to SNO0 terminal 32a. The result of these re-connections is as shown at the top of FIG. 2A. The omission of LSB circuit 59 reduces the area needed for implementation of slice circuit 28 and further reduces any propagation delays associated with all outputs of slice circuit 28.

With reference to FIGS. 2 and 3, the TDI input and TDO output terminals 38 and 36, respectively, of each slice circuit 28 allow more significant slice circuits 28 to know that a transition bit has been detected in a less significant slice circuit 28. Thus, when the transition detected input (TDI) signal at terminal 38 of a slice circuit 28 is active, the normal operation of the slice's controller 42 is overridden so that all bits operated upon by the slice circuit 28 are inverted. In addition the slice's transition detected output (TDO) signal will activate. The slice's transition detected output (TDO) will also activate if any bit of the incoming number is a logical one, regardless of whether the TDI signal is active.

While FIG. 2 shows one form of a combinatorial logic circuit which serves as selective negation slice circuit 28, those skilled in the art will appreciate numerous equivalent forms may be devised as well. For example, when operating on incoming numbers having longer bit lengths, it may be desirable to speed the propagation delay associated with generating the transition detected output signal. In the FIG. 2 embodiment, this signal becomes valid only after gate delays associated with OR gates 50 of controller 42 and OR gate 56 of transition bit detector 46 have transpired.

FIG. 4 illustrates an alternate embodiment of transition bit detector 46. In FIG. 4, TDI terminal 38 and incoming number terminals 30a, 30b, 30c, and 30d all couple to inputs of a five input OR gate 60. An output of OR gate 60 couples to a first input of a two input AND gate 62. A second input of AND gate 62 couples to SN terminal 34. An output of AND gate 62 couples to TDO terminal 36. In the FIG. 4 embodiment of transition bit detector 46, the TDO output becomes valid after only the two gate delays associated with gates 60 and 62. Thus, the FIG. 4 embodiment of transition bit detector 46 provides only two gate delays for each four bits of incoming number being operated upon by selective negation circuit 58 (see FIG. 3). This delay is significantly less than is associated with carry bits which ripple through stages of a conventional adder, even when look-ahead carry schemes are adopted. Consequently, negations may be generated much faster than result from using adders or ALUs to negate incoming numbers.

Figure 5:
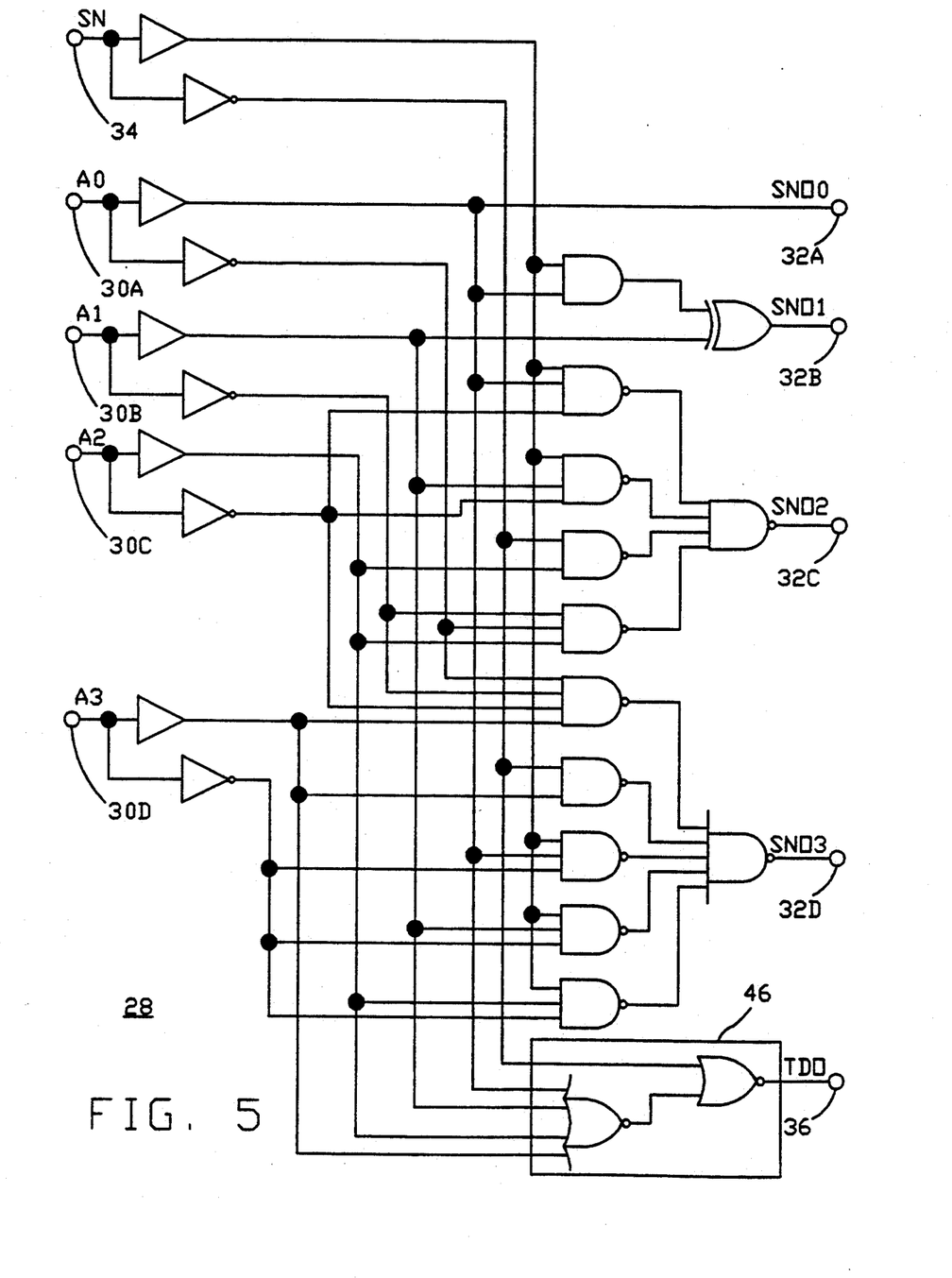
FIG. 5 shows a schematic logic diagram of a second embodiment of a selective negation slice circuit.

FIG. 5 shows a schematic logic diagram of a second embodiment of selective negation slice circuit 28. The FIG. 5 embodiment of slice circuit 28 shows an alternate combinatorial logic circuit which performs the functions discussed above in connection with FIGS. 1-2. This particular embodiment omits circuitry related to TDI input terminal 38. While the FIG. 5 embodiment of slice circuit 28 may require additional area for implementation when compared to the FIG. 2 embodiment of slice circuit 28, it may operate with less propagation delay. In the FIG. 2 embodiment of slice circuit 28, the higher significance level output SNO3 at terminal 32d becomes valid only after propagation delays associated with Exclusive OR gate 52d in selective invertor 44, all OR gates 50 in controller 42, and AND gate 48a in negation selector 40. On the other hand, the FIG. 5 embodiment of slice circuit 28 allows all outputs to be valid after no more than three gate propagation delays. Those skilled in the art may determine whether the FIG. 2 embodiment, the FIG. 5 embodiment, or another embodiment is best suited for a particular application.

Figure 6:
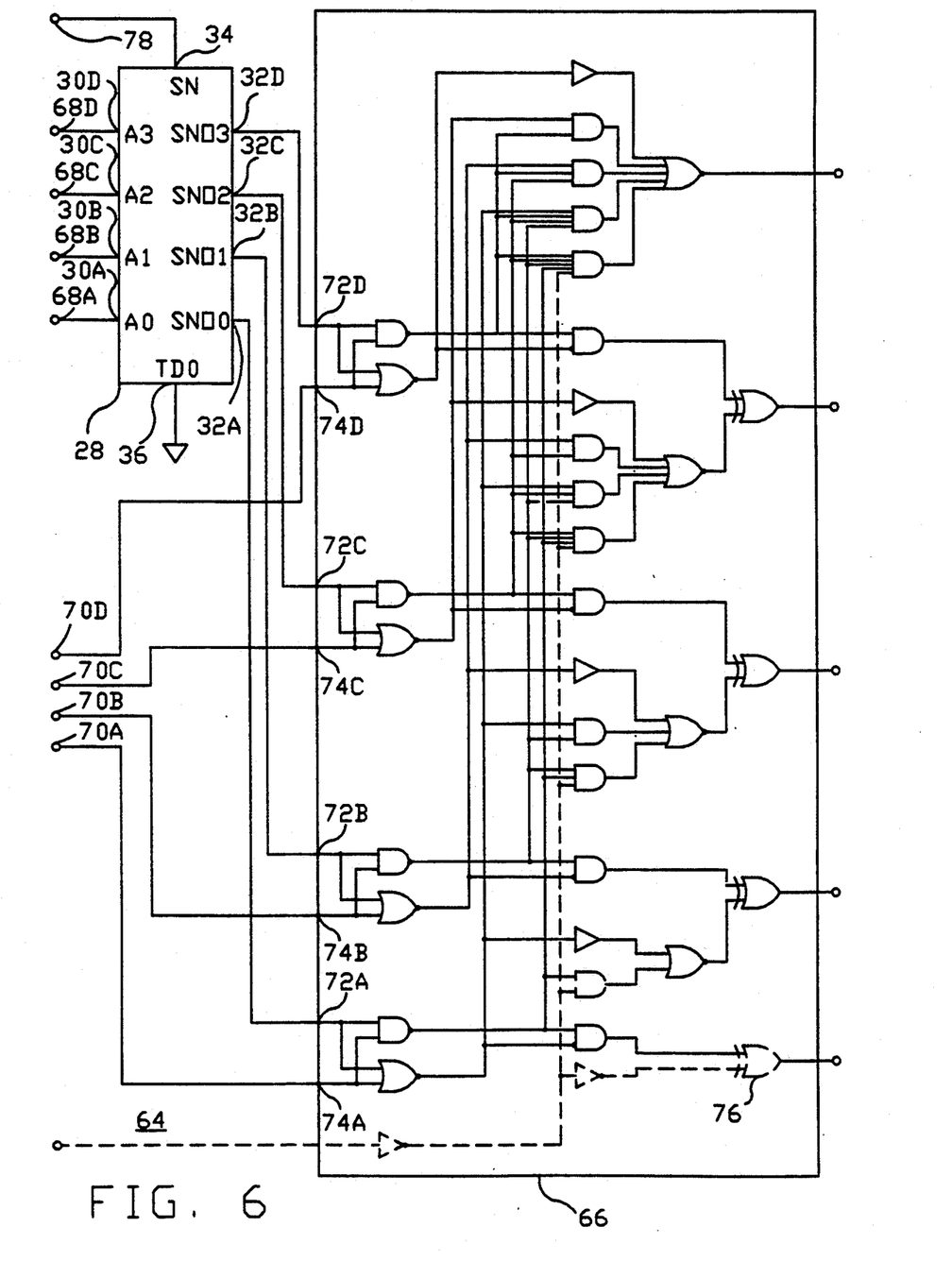
FIG. 6 shows a four bit direct adder/subtractor circuit which incorporates a selective negation slice circuit.

FIG. 6 shows a four-bit direct adder/subtractor circuit 64 which incorporates one selective negation slice circuit 28 and an adder 66. A first number is applied at terminals 68a-68d. Terminals 68a-68d couple to input terminals 30a-30d, respectively, of slice circuit 28. A second number is applied at terminals 70a-70d. Output terminals 32a-32d of slice circuit 28 couple to inputs 72a-72d, respectively, of adder 66, and terminals 70a-70d couple to inputs 74a-74d, respectively, of adder 66.

Adder 66 may represent a conventional adder, such as that provided by a 7483, 74283, or other related well-known devices manufactured by numerous suppliers of digital integrated circuits. However, carry input circuitry may be omitted from adder 66. FIG. 6 illustrates details of a conventional adder 66, with conventional carry-input circuitry shown in phantom. This circuitry may be omitted. As illustrated by FIG. 6, circuit area is reduced by omitting carry input circuitry. In addition, propagation delays decrease. In particular, the removal of an Exclusive OR gate 76 which supplies the least significant output bit of adder 66 causes this output bit to become valid more quickly than results with the inclusion of carry input circuitry. The removal of carry input circuitry causes this least significant output bit of adder 66 to be influenced only by the signals present on terminals 72a and 74a of adder 66.

In operation, when a signal applied to a terminal 78, which couples to SN terminal 34 of slice circuit 28, exhibits an active level, slice circuit 28 generates a negation of the first number. This negated first number is presented to first inputs 72a-72d of adder 66. The second number is presented directly to second inputs 74a-74d of adder 66. No carry input pulse is supplied to adder 66, and the output of adder 66 generates the sum of the second number with the negation of the first number. In other words, adder/subtractor circuit 64 subtracts the first number from the second number. When a signal applied to terminal 78 exhibits an inactive level, slice circuit 28 reproduces the first number at its output, without negation. Adder 66 then adds the first and second numbers together.

Of course, negation selector 40 (see FIG. 2) may be omitted, as discussed above. With negation selector 40 omitted, slice circuit 28 only generates negations of incoming numbers, and circuit 66 then forms a subtractor.

While FIG. 6 illustrates a four bit direct adder/subtractor, those skilled in the art will understand that the principles taught above in FIG. 3 may be combined with well-known multi-slice adding techniques to permit first and second numbers of any length to be subtracted and/or added together. Likewise, those skilled in the art will understand that the principles taught above in FIGS. 1-5 may be applied to any size of arithmetic logic unit (not shown) as well.

In summary, the present invention provides an improved arithmetic circuit. The arithmetic circuit of the present invention may be incorporated in a wide variety of applications, including arithmetic logic units (ALUs) for microprocessors or other computing circuits, add-/subtract circuits, subtraction circuits, and negation circuits. The present invention generates a two's complement negation of an incoming number in a small amount of space and with a small amount of propagation delay. The present invention may selectively generate a negation of an incoming number. This selective negation may be combined with an adder to selectively perform addition and subtraction operations, wherein the subtraction operations are performed in a direct manner which does not require the generation of a carry input pulse. Moreover, the present invention may be adapted to efficiently generate negations for incoming numbers having any number of bits.

The present invention has been described above with reference to preferred embodiments. However, those skilled in the art will recognize that changes and modifications may be made in these preferred embodiments without departing from the scope of the present invention. For example, the schematic logic diagrams described herein are adapted to accommodate positive logic. However, those skilled in the art may easily adapt this teaching to accommodate negative logic as well. Moreover, the teaching of this invention may be applied to a wide variety of circuits. The present invention may be implemented using discrete logic. The present invention may be implemented on a common substrate using any one of a wide variety of known integrated circuit processing techniques as a negation circuit, a selective negation circuit, a subtractor, or an adder/subtractor circuit. In addition, the present invention may be incorporated into an ALU of a microprocessor or other computer device. Likewise, while a selective negation slice circuit having four bits has been described herein, those skilled in the art will appreciate that the selective negation circuitry discussed herein need not be configured in slices of any particular length and that the selective negation slice circuitry may be configured to incorporate any number of bits. These and other changes and modifications which are obvious to those skilled in the art are intended to be included within the scope of the present invention.

What is claimed is:

1. A binary two's complement arithmetic circuit for performing arithmetic operations on an incoming number expressed as N bits, where N is an integer number, where each of said N bits exhibits either a logic zero or a logic one, and where a transition bit of said N bits is the least significant one of said N bits to exhibit a logic one, said circuit comprising:
   input means having N terminals adapted to receive said N bits of said incoming number in a one-to-one correspondence;
   a combinatorial logic circuit coupled to said input means, said combinatorial logic circuit being configured to invert all bits of said incoming number having greater significance than said transition bit and to transfer, without inverting, said transition bit and all bits having less significance than said transition bit; and
   output means, coupled to said combinatorial logic circuit, having N−1 terminals corresponding to the N−1 most significant ones of said N bits of said incoming number.

2. A binary two's complement arithmetic circuit as claimed in claim 1 wherein said combinatorial logic circuit comprises:
   a selective invertor having N−1 control-inputs, having N−1 number-inputs, wherein said number-inputs are coupled to said input means to receive the N−1 most significant ones of said N bits of said incoming number, and having N−1 outputs; and
   a controller, having N−1 inputs coupled to said input means to receive the least significant N−1 bits of said incoming number and having N−1 outputs coupled to said N−1 control-inputs of said selective invertor in a one-to-one correspondence.

3. A binary two's complement arithmetic circuit as claimed in claim 2 wherein:
   said selective invertor comprises N−1 exclusive OR gates associated with the N−1 most significant bits of said incoming number in a one-to-one correspondence; and
   said controller comprises N−2 OR gates, wherein each of said OR gates has an output coupled to a corresponding one of the exclusive OR gates associated with the N−2 most significant bits of said incoming number.

4. A binary two's complement arithmetic circuit as claimed in claim 3 wherein:
   the level of significance of a given bit of said incoming number, the level of significance of the one of said exclusive OR gates with which said given bit is associated, and the level of significance of the one of said OR gates whose output couples to the exclusive OR gate with which said given bit is associated may all be represented by an integer number L having a value from 2 to N; and
   each of said OR gates having a significance L ≧ 3 has a first input coupled to an output of the one of said OR gates that has significance L−1, a second input coupled to said input means to receive the one of said bits of said incoming number that has significance L, and an output coupled to an input of the one of said exclusive OR gates that has significance L.

5. A binary two's complement arithmetic circuit as claimed in claim 4 wherein the one of said OR gates that has significance L=2 has a first input coupled to said input means to receive the one of said bits of said incoming number that has significance L=0, a second input coupled to said input means to receive the one of said bits of said incoming number that has significance L=1, and an output coupled to an input of the one of said exclusive OR gates that has significance L=2.

6. A binary two's complement arithmetic as claimed in claim 1 wherein said combinatorial logic circuit further comprises:
   a terminal adapted to provide a transition-detected output signal.

7. A binary two's complement arithmetic circuit as claimed in claim 6 wherein said combinatorial logic circuit further comprises:
   means for detecting the transition bit and providing the transition-detected output signal indicative thereof.

8. A binary two's complement arithmetic circuit as claimed in claim 1 wherein said combinatorial logic circuit further comprises:
   a terminal adapted to receive a transition-detected input signal.

9. A binary two's complement arithmetic circuit as claimed in claim 8 wherein said combinatorial logic circuit further comprises:
   means for inverting all bits of said incoming number when said transition-detected input signal is active.

10. A binary two's complement arithmetic circuit as claimed in claim 1 wherein:
    said input means, combinatorial logic circuit, and said output means together form a negation circuit; and
    said arithmetic circuit additionally comprises an adder having a first input coupled to said output means and having a second input adapted to receive a second incoming number from which said incoming number is to be subtracted.

11. A binary two's complement arithmetic circuit as claimed in claim 1 wherein said output means further comprises:
    an output terminal coupled to an N input means terminal adapted to receive the least significant bit of said incoming number.

12. A binary two's complement arithmetic circuit as claimed in claim 1 wherein said combinatorial logic circuit further comprises:
    a terminal adapted to receive a select-negation input signal; and
    means for transferring, without inverting, all of said bits of said incoming number when said select-negation signal is inactive.

13. A binary two's complement arithmetic circuit as claimed in claim 12 wherein:
    said input means, combinatorial logic circuit, and said output means together form a selective negation circuit; and
    said arithmetic circuit additionally comprises an adder having a first input coupled to said N terminals of said selective negation circuit output means and having a second input adapted to receive a second incoming number from which or to which said incoming number is to be subtracted or added depending on whether said select-negation signal is active or inactive.

14. A binary two's complement arithmetic circuit as claimed in claim 1 wherein said adder further comprises:
means for further providing a least significant output bit which is influenced only by the state of the least significant bits of said first and second incoming numbers.

15. A method for performing binary two's complement arithmetic on an incoming number expressed as N bits, where N is an integer number, where each of said N bits exhibits either a logic zero or a logic one, and where a transition one of said N bits is the least significant one of said N bits to exhibit a logic one, said method comprising the steps of:
inverting those bits of said incoming number which have greater significance than said transition bit; and
transferring without inverting said transition bit of said incoming number and those bits of said incoming number which have less significance than said transition bit.

16. A method for performing binary two's complement arithmetic as claimed in claim 15 additionally comprising the step of providing a transition-detected output signal that indicates whether said incoming number includes said transition bit.

17. A method for performing binary two's complement arithmetic as claimed in claim 16 additionally comprising the steps of:
receiving a transition-detected input signal; and
inverting all bits of said incoming number when said transition-detected signal is active.

18. A method for performing binary two's complement arithmetic as claimed in claim 15, which prior to the inverting and transferring steps, additionally comprises the steps of:
receiving a select-negation input signal; and
transferring without inverting all of said bits of said incoming number when said select-negation signal is inactive and performing the subsequent inverting and transferring steps when the select-negation signal is active.

19. A method for performing binary two's complement arithmetic as claimed in claim 18 wherein:
said inverting and transferring steps produce a selectively negated incoming number; and
said method additionally comprises the step of adding said selectively negated incoming number to a second incoming number.

20. A binary two's complement arithmetic circuit for directly adding first incoming numbers to second incoming numbers and for subtracting said first incoming numbers from said second incoming numbers, wherein said first incoming numbers are expressed as N bits, where N is an integer number, where each of said N bits exhibits either a logic zero or a logic one, and where a transition one of said N bits is the least significant one of said N bits to exhibit a logic one, said circuit comprising:
input means having N terminals adapted to receive said N bits of said first incoming numbers in a one-to-one correspondence;
a selection terminal adapted to receive a select-negation input signal;
a combinatorial logic circuit coupled to said input means and to said selection terminal, said combinatorial logic circuit having N outputs corresponding to said N bits of said first incoming numbers and being configured to:
invert all bits of said first incoming numbers having greater significance than said transition bits thereof when said select-negation signal is active,
transfer without inverting said transition bits thereof and all bits of said first incoming numbers having less significance than said transition bits when said select-negation signal is active, and
transfer, without inverting, all of said bits of said first incoming numbers when said select-negation signal is inactive;
a binary adder having a first input coupled to said N outputs of said combinatorial logic circuit and having a second input adapted to receive said second incoming numbers.

21. A binary two's complement arithmetic circuit as claimed in claim 20 wherein said combinatorial logic circuit additionally comprises:
a terminal adapted to provide a transition-detected output signal.

22. A binary two's complement arithmetic circuit as claimed in claim 21 wherein said combinatorial logic circuit further comprises:
means for detecting the transition bit and providing the transition-detected output signal indicative thereof.

23. A binary two's complement arithmetic circuit as claimed in claim 20 wherein said combinatorial logic circuit additionally comprises:
a terminal adapted to receive a transition-detected input signal.

24. A binary two's complement arithmetic circuit as claimed in claim 23 wherein said combinatorial logic circuit further comprises:
means for transferring without inverting said transition bit and all bits of said first incoming numbers having less significance than said transition bit when said select-negation signal is active and when said transition-detected input signal is inactive,
means for inverting all bits of said first incoming numbers when said transition-detected output signal is active; and
means for transferring without inverting all of said bits of said first incoming numbers when said select-negation signal is inactive.

25. A binary two's complement arithmetic circuit for performing arithmetic operations on an incoming number expressed as N bits, where N is an integer number, where each of said N bits exhibits either a logic zero or a logic one, and where a transition bit of said N bits i the least significant one of said N bits to exhibit a logic one said circuit comprising:
input means having N terminals adapted to receive said N bits of said incoming number in a one-to-one correspondence,
a first combinatorial logic circuit coupled to said input means, said combinatorial logic circuit detecting the occurrence of the transition bit and inverting all bits of said incoming number having greater significance than said transition bit and transferring, without inverting, said transition bit and all bits having less significance than said transition bit,
output means coupled to said first combinatorial logic circuit having N terminals corresponding to the N bits of said incoming number, a transition-detected output terminal adapted to provide a transition-detected output signal which is active when the transition bit has occurred and is otherwise inactive, a select-negation terminal adapted to receive a select-negation input signal, and the transition-detected output signal being in phase with the select-negation input signal.

26. A binary two's complement arithmetic circuit as claimed in claim 25 further comprising:

a second combinatorial logic circuit coupled to the first combinatorial logic circuit and to N additional more significant bits of the incoming number having:

a terminal adapted to receive the transition-detected output signal as a transition-detected input signal, means for inverting all N additional more significant bits of the incoming number in the second combinatorial logic circuit when said transition-detected input signal is active, and means for detecting the occurrence of the transition bit when said transition-detected input signal is inactive.

* * * * *